United States Patent [19]

Sekine et al.

[11] Patent Number: 5,061,935

[45] Date of Patent: Oct. 29, 1991

[54] THREE-DIMENSIONAL DISPLAY RADAR

[75] Inventors: Chogo Sekine; Takeshi Abe, both of Tokyo, Japan

[73] Assignee: Nihon Musen Kabushiki Kaisha, Tokyo, Japan

[21] Appl. No.: 670,316

[22] Filed: Mar. 15, 1991

[30] Foreign Application Priority Data

Mar. 19, 1990 [JP] Japan .................................. 2-69297

[51] Int. Cl.⁵ .............................................. G01S 7/20
[52] U.S. Cl. ................................... 342/180; 342/182
[58] Field of Search ............... 342/182, 183, 180, 176, 342/178, 179

[56] References Cited

U.S. PATENT DOCUMENTS

| | | | |
|---|---|---|---|
| 3,792,423 | 2/1974 | Becker et al. | 367/11 |
| 3,971,020 | 7/1976 | Howard | 342/129 |
| 4,527,161 | 7/1985 | Wehner | 342/152 |

*Primary Examiner*—John B. Sotomayor
*Attorney, Agent, or Firm*—Frishauf, Holtz, Goodman & Woodward

[57] ABSTRACT

Disclosed herein is a three-dimensional display radar, which comprises a radar transmitter-receiver unit for producing signals indicative of information about a bearing of a target, information about distance to the target and information about the received power reflected from the target, respectively, a display, a three-dimensional coordinate converter for converting the bearing information, the distance information and the received power information into signals indicative of both an X-Y coordinate and the height of the target, marker generator for generating range marker signals when the target is three-dimensionally represented on a screen of the display, and a video memory having storage addresses corresponding to respective pixels on the display and for storing the received power information at a storage address corresponding to the X-Y coordinate obtained from the three-dimensional coordinate converter and storing therein the marker signals generated from the marker generator, the video memory being further adapted to successively read the received power information and the marker signals so as to deliver image signals to the display.

14 Claims, 3 Drawing Sheets

THREE-DIMENSIONAL DISPLAY RADAR

BACKGROUND OF THE INVENTION

1. Field of the Invention

The present invention relates to a three-dimensional display radar which is installed in a ship or the like to accurately detect a target, and more specifically to a three-dimensional display radar of a type wherein a two-dimensional display in the form of a concentric circle is made based on information about a bearing of a target, distance to the target and the received power reflected from the target, which information being obtained in accordance with transmission and reception processing of a known radar, the height of the target to be detected is represented by the length (in the Y direction) of a displayed image, and an image in the form of the three-dimensional display of a target and a reflective object with the distinctive impression of distance and the three-dimensional aspect is formed by superposing grid-shaped markers based on the perspective representation on each other and three-dimensionally representing the so-superposed markers, thereby making it possible to effectively perform the observation of a screen, specifically the grasping, i.e., detection of states of both the target and the reflective object.

PRIOR ART

In recent years, radar has widely been employed in small ships such as pleasure boats, etc.

As already well known, this type of radar is activated in such a manner that a wave as a signal transmitted from a rotating antenna is reflected from a target so as to receive the reflected wave, thereby displaying an image in the form of a concentric circle in which the position of "own ship" is centered, on a display. In this case, the received power of the reflected wave is displayed on a screen of a display of a raster-scan type as the difference in brightness between points indicative of targets Such a radar system as mentioned above can carry out the observation of a moving ship which approaches the observing, i.e. own ship while the latter is under navigation or at anchor in harbor, or provide supervision as to whether or not the own ship is dredged, i.e., deviated from a position where it stays in harbor due to the tidal current or the like, based on a wave reflected from a fixed reflective object.

However, in the radar for the ship according to the prior art, the display of the points indicative of the targets on the screen of the display is two-dimensional, as a plan view. The display of the height of the target on the screen thereof, e.g., the display of an image based on the height of the target, is not carried out.

Thus, when the radar is installed in the pleasure boat or the like, difficulties are encountered upon effectively grasping and observing surrounding conditions and detecting the target from the displayed image with respect to operators who are relatively unfamiliar with the radar observation, thereby causing a problem that the installed radar is hard to avail effectively.

SUMMARY OF THE INVENTION

It is a principal object of the present invention to provide a radar capable of three-dimensionally displaying targets on a screen thereof by operators who are relatively unfamiliar with radar observation so they are able to more easily understand the display.

It is another object of the present invention to provide a three-dimensional display radar capable of effectively carrying out the observation of a screen, specifically the realization and detection of states of a target or other reflective object by displaying an image in the form of the three-dimensional representation of the target or other reflective object with the distinct impression of both distance and the three-dimensional aspect.

It is a further object of the present invention to provide a three-dimensional display radar comprising a radar transmitter-receiver unit for producing signals indicative of information about the bearing of a target, information about distance to the target and information about the received power reflected from the target, respectively, a display, a three-dimensional coordinate converter for converting the bearing information, the distance information and the received power information into signals indicative of both an XY coordinate and the height of the target, marker generating means for generating range marker signals when the target is three-dimensionally represented on the display screen, and memory means having storage addresses corresponding to respective pixels on the display and for storing the received power information at a storage address corresponding to the X-Y coordinate obtained from the three-dimensional coordinate converter and storing therein the marker signals generated from the marker generating means, the memory means being further adapted to successively read the received power information and the marker signals so as to deliver image signals to the display.

It is a still further object of the present invention to provide the three-dimensional display radar wherein the display is of a raster-scan type.

It is a still further object of the present invention to provide the three-dimensional display radar wherein the marker generating means is used to generate signals indicative of grid-shaped range markers.

It is a still further object of the present invention to provide the three-dimensional display radar wherein the memory means is a video memory.

It is a still further object of the present invention to provide the three-dimensional display radar further comprising a two-dimensional coordinate converter for converting the bearing information and the distance information into a X-Y coordinate.

It is a still further object of the present invention to provide the three-dimensional display radar wherein the marker generating means is used to generate signals indicative of concentric circle-shaped range markers when the target is two-dimensionally represented on the screen of the display.

It is a still further object of the present invention to provide the three-dimensional display radar wherein the memory means stores therein received power information at a storage address corresponding to the X-Y coordinate obtained from the two-dimensional coordinate converter when the target is two-dimensionally represented on the screen of the display and also stores therein the range marker signals generated from the marker generating means, the memory means being further used to successively read the received power information and the range marker signals stored therein so as to deliver image signals to the display.

It is a still further object of the present invention to provide the three-dimensional display radar further comprising mode selecting means for selecting either the three-dimensional coordinate converter or the two-dimensional coordinate converter.

It is a still further object of the present invention to provide the three-dimensional display radar wherein when the mode selecting means selects the two-dimensional coordinate converter, the display shows, as brightness information, a target captured through the radar transmitter-receiver unit according to the received power, and when the mode selecting means selects the three-dimensional coordinate converter, the display shows, as height information, the target captured through the radar transmitter-receiver unit according to the received power.

It is a still further object of the present invention to provide the three-dimensional display radar wherein the memory means is a video memory.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
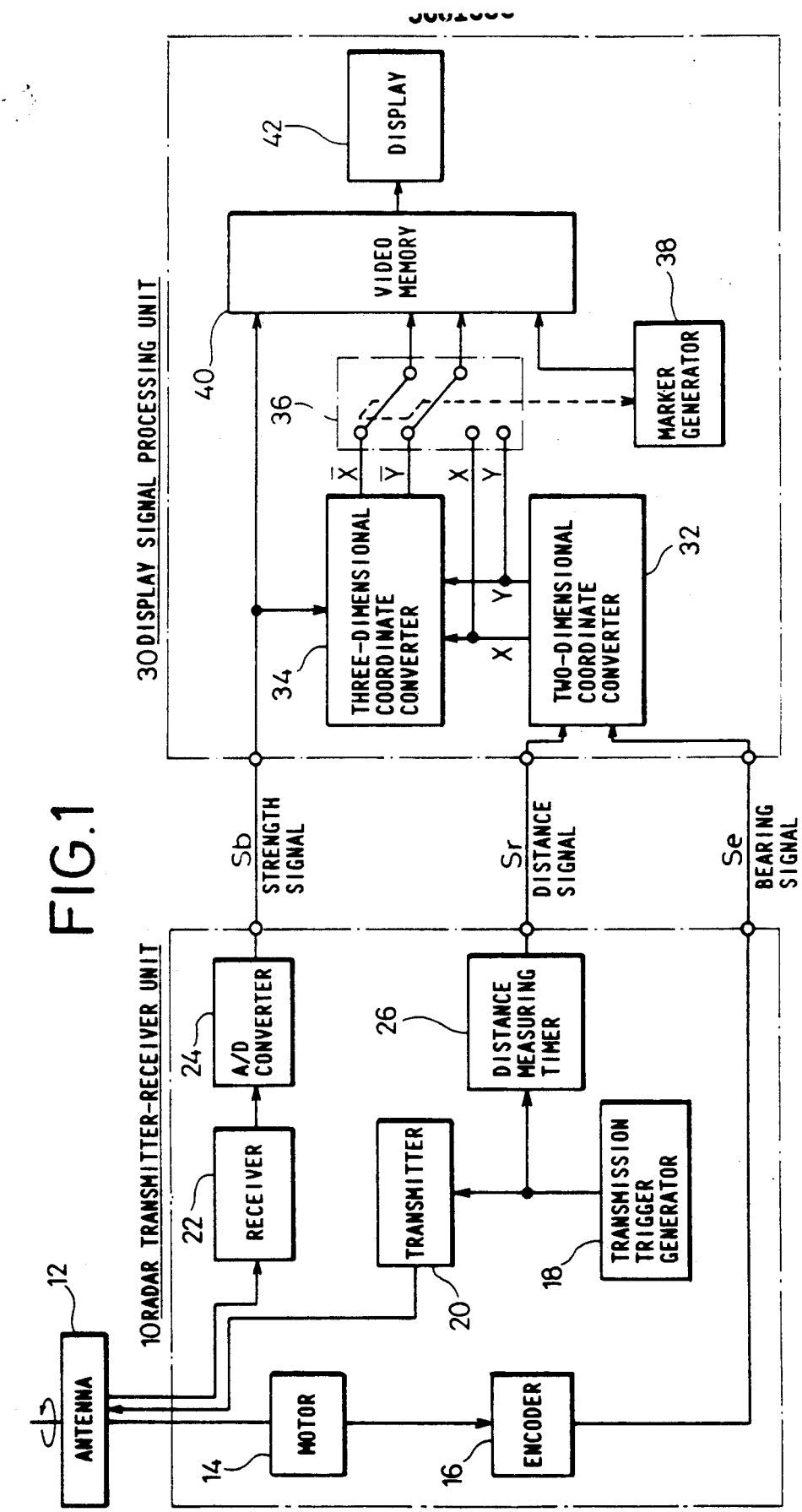
FIG. 1 is a block diagram showing the structure of a three-dimensional display radar according to one embodiment of the present invention.

Referring to FIG. 1, designated at numeral 10 is a known radar transmitter-receiver unit. The radar transmitter-receiver unit 10 comprises a motor 14 used to rotate an antenna 12, an encoder 16 coupled to a rotary drive shaft of the motor 14, a transmission trigger generator 18, a transmitter 20 used to transmit a transmission signal having a predetermined frequency from the antenna 12, a receiver 22 electrically connected to the antenna 12 to receive a wave reflected from a target, an A/D converter 24 used to digitize a signal outputted from the receiver 22, and a distance measuring timer 26 electrically connected to the transmission trigger generator 18.

On the other hand, designated at numeral 30 is a display signal processing unit. The display signal processing unit 30 comprises a two-dimensional coordinate converter 32, a three-dimensional coordinate converter 34, a mode selecting switch 36, an ON/OFF-operable marker generator 38, a video memory (memory means) 40, and a raster-scan type display 42.

A description will now be made of the operation of a three-dimensional display radar of the present invention constructed as described above.

In the radar transmitter-receiver unit 10, the motor 14 is driven to rotate the antenna 12 in a horizontal plane.

Then, the encoder 16 outputs a bearing signal $S\theta$ indicative of bearing information ($\theta$) of the antenna 12 with respect to a moving object, e.g., a ship's heading so as to be introduced into one of input terminals of the two-dimensional coordinate converter 32.

A transmission trigger outputted from the transmission trigger generator 18 is inputted to the transmitter 20. The transmitter 20 transmits a transmission pulse generated from a magnetron or the like through the antenna 12 in response to the transmission trigger. Then, a wave reflected from an unillustrated target is supplied to the receiver 22 through the antenna 12. The value of amplitude of a received signal produced from the receiver 22, i.e., a strength signal Sb indicative of received power information of the reflected wave is converted into a digital signal by the A/D converter 24 so as to be delivered to the display signal processing unit 30.

A description will now be made of the strength signal Sb. The directivity of an antenna employed in a general radar for a ship is normally set approximately to a horizontal beam width of 2° and a vertical beam width of 25°. Therefore, the reflectivity of a wave reflected from a high target is greater than that of a wave reflected from a low target when detecting a short-distance target. Thus, a three-dimensional image display can be performed by signal processing to be described later using the difference in level between received signals.

In addition, the transmission trigger outputted from the transmission trigger generator 18 is also supplied to the distance measuring timer 26, which in turn counts the time elapsed from the time that the transmission trigger signal is supplied thereto. The distance measuring timer 26 delivers the value of ½ the product of the time elapsed and the propagation velocity of a wave, i.e., information about the range or distance to the target, to the other of the input terminals of the two-dimensional coordinate converter 32 as a distance signal Sr. Incidentally, the distance measuring operation is completed by detecting the time elapsed indicative of the maximum measurable range set in advance by a switch (not shown).

The bearing signal $S\theta$, the strength signal Sb, and the distance signal Sr obtained from the radar transmitter-receiver unit 10 in this way are supplied to the display signal processing unit 30.

First of all, the two-dimensional coordinate converter 32 receives the bearing signal $S\theta$ and the distance signal Sr so as to convert the position (R, $\theta$) of the target represented in a polar coordinate system into a signal corresponding to a X-Y coordinate (X, Y) on a screen of the raster-scan type display 42.

Figure 2:
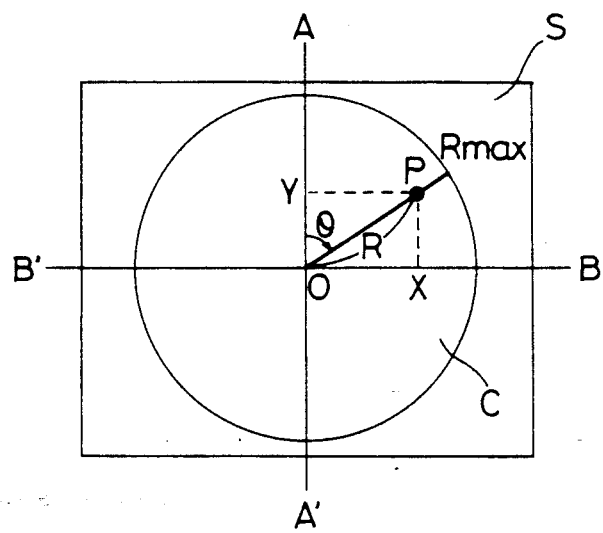
FIG. 2 is a diagram for describing the operation of a two-dimensional coordinate converter according to said one embodiment shown in FIG. 1.

A description will now be made of the operation of the two-dimensional coordinate converter 32 with reference to FIG. 2.

The reference character S denotes a display screen of the two-dimensional coordinate converter 32 of the raster-scan type. The reference characters C, $\overline{BB'}$ and $\overline{AA'}$ represent a circle with a radius $\overline{Rmax}$, a X-axis which passes through the center 0 of the display screen S, and a Y-axis which passes through the center of the display screen S, respectively. In addition, the center 0 shows the position of "own ship".

When a radio wave is radiated from the antenna 12 in a direction in which it is rotated through an angle $\theta$ from the own ship with respect to a ship's heading (in the direction indicated by line A), the wave travels toward a Rmax. The two-dimensional coordinate converter 32 is used to calculate a X-coordinate value and a Y-coordinate value of each pixel between $\overline{O}$ and $\overline{R_{max}}$. For example, the values of coord a pixel represented in the form of a target (R, $\theta$) are defined by a Rcos$\theta$ and a Rsin$\theta$, respectively.

An output signal indicative of the values of the coordinates (X, Y) of the pixel on the display screen S, which are calculated as mentioned above from the two-dimensional coordinate converter 32 is inputted to the video memory 40 and the three-dimensional coordinate converter 34 through the mode selecting switch 36.

Then, the three-dimensional coordinate converter 34 performs arithmetical operation for displaying three-dimensional information on a two-dimensional coordinate in pseudo manner. The value of the strength signal Sb indicative of the received power of the wave reflected from the target is added to the values of a two-dimensional coordinate P (X, Y) of the target so as to obtain a three-dimensional information represented as a coordinate Q ($\overline{X}$, $\overline{Y}$) for performing a three-dimensional display on the two-dimensional coordinate.

The thus-obtained three-dimensional information is inputted to the video memory 40 through the mode selecting switch 36.

Figure 3:
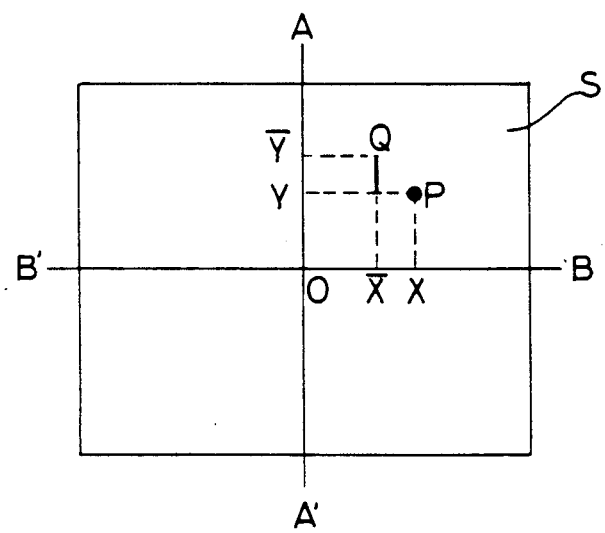
FIG. 3 is a diagram for describing the operation of a three-dimensional coordinate converter according to said one embodiment shown in FIG. 1.

A description will no be made of the operation of the three-dimensional coordinate converter 34 with reference to FIG. 3.

Assuming now that the two-dimensional coordinate indicative of the pixel of the target on the display screen S is P (X, Y), and the received power (the level of the strength signal Sb) of the wave reflected from the target is SB, the three-dimensional coordinate converter 34 produces the three-dimensional information represented as Q ($\overline{X}$, $\overline{Y}$) based on the P (X, Y) and SB. The $\overline{X}$ coordinate in the coordinate ($\overline{X}$, $\overline{Y}$) indicative of the pixel on the display screen S is represented in accordance with the following expression:

$$\overline{X} = X - K_X Y (X \geq 0) \quad (1)$$
$$= X + K_X Y (X < 0)$$

where $K_X$ is a positive constant, suitably selected.

On the other hand, the $\overline{Y}$ coordinate in the coordinate ($\overline{X}$, $\overline{Y}$) indicative of the pixel is represented in accordance with the following expression:

$$Y \leq \overline{Y} \leq Y + K_Y SB \ldots \quad (2)$$

where $K_Y SB$ is a positive constant, suitably selected.

More specifically, the point P of the target on the two-dimensional coordinate is represented so as to approach the Y-axis according to the front and rear positions of the own ship on the three-dimensional coordinate or to be away from the Y-axis, thereby producing a distinctive impression of distance between the point P and the Y-axis. In addition, the point P of the target on the two-dimensional coordinate is represented on the three-dimensional coordinate so as to be spread in a vertical direction according to the received power SB (the level of the strength signal Sb) of the wave reflected from the target. As a consequence, the point P is perceptible to vision with the three-dimensional feeling being produced.

On the other hand, the video memory 40 has a storage address corresponding to each pixel on the display 42. The video memory 40 stores, as data, the received power SB (the level of the strength signal Sb) of the reflected wave at a storage address corresponding to the coordinate (X, Y) indicative of the pixel as the output signal from the two-dimensional coordinate converter 32. As an alternative, the video memory 40 stores, as data, the received power SB (the level of the strength signal Sb) of the reflected wave at a storage address corresponding to the coordinate ($\overline{X}$,$\overline{Y}$) indicative of a pixel as an output signal from the three-dimensional coordinate converter 34. Further, data indicative of a marker signal, which is superposed on the former SB and the latter SB and inputted from the marker generator 38 is stored at a storage address corresponding to the coordinate indicative of a pixel at a marker position. The marker generator 38 is used to generate a coordinate indicative of a pixel of a range marker, which is to be written into the video memory 40. Then, the marker generator 38 generates pixel signals for coordinates corresponding to concentric circles formed at one-mile radius intervals from the own ship, for example, as represented as M11, M12 and M13 in FIG. 4 when the mode selecting switch 36 selects a two-dimensional display mode.

Figure 5:
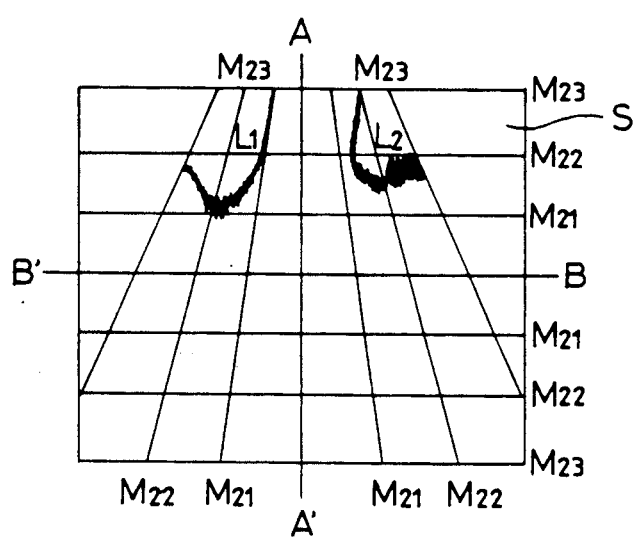
FIG. 5 is a diagram illustrating a three-dimensionally displayed image.

Further, when the mode selecting switch 36 selects a three-dimensional display mode, the marker generator 38 generates pixel signals for coordinates corresponding to grids provided horizontally and vertically from the own ship for every mile, for example, as represented as M21, M22 and M23 in FIG. 5, and supplies the so-generated pixel signals to the video memory 40 through the mode selecting switch 36.

The video memory 40 is operated in synchronism with raster scans of the display 42 so as to read the contents at storage addresses corresponding to respective coordinates on the display screen S of the display 42, thereby inputting the so-read contents to the display 42. Thus, they are displayed on the display screen S as variations in the brightness of each pixel.

Figure 4:
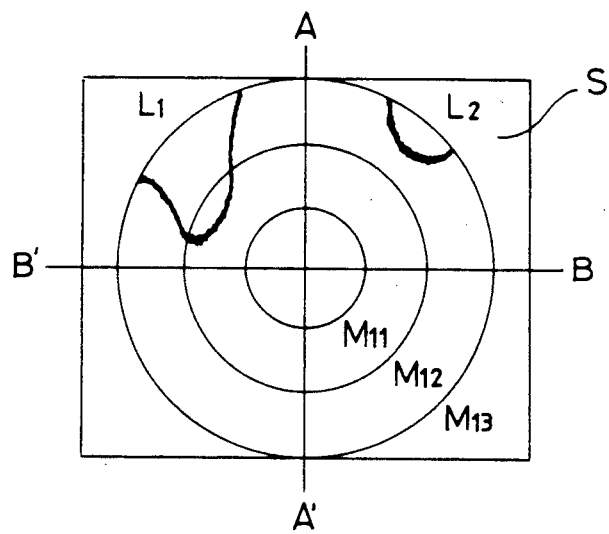
FIG. 4 is a diagram showing a two-dimensionally displayed image.

As described above, when the two-dimensional display mode is selected by the mode selecting switch 36, the configurations of land L1 and L2 are represented in the form of conventionally-known normal lines on the screen S of the display 42, as shown in FIG. 4. Portions whose received power SB (the level of the strength signal Sb) is high in level are displayed on the screen S in a state in which their brightness is at a high level.

When the three-dimensional display mode is selected by the mode selecting switch 36 under the same conditions, the configurations of land L1 and L2 are represented as the heights (in a Y direction) according to variations in the received power SB (the level of the strength signal Sb) of the wave reflected from the target. As a consequence, an image on the screen S of the display 42 produces a distinctive impression of distance.

Incidentally, the marker generator 38 is turned off to facilitate the confirmation of the target when the points indicative of the target and the markers are superposed on each other. However, this belongs to the prior art.

According to the three-dimensional display radar, as has been described above, the two-dimensional display in the form of the concentric circle is performed based on the information about the bearing, the distance and the received power, which is obtained in accordance with the transmission and reception processing of the known radar. In addition, the height to be detected is represented by the length (in the Y direction) of the displayed image, and the three-dimensional display of the target is made by superposing the grid-shaped markers on each other based on the perspective representation.

As a consequence, the formation of the image in the form of the three-dimensional representation of the target and the reflective object with the distinctive impression of distance and the three-dimensional aspect is made as well as the formation of the image in the form of the two-dimensional representation. Therefore, the observation of the screen, specifically, the grasping of states of the target and reflective object, can effectively be performed.

Further, according to the above-mentioned arrangement, the grasping and observation of the surrounding conditions can be performed from the displayed image as promptly as possible even in the case of an operator who is relatively unfamiliar with radar observation.

Having now fully described the invention, it will be apparent to those skilled in the art that many changes and modifications can be made without departing from the spirit or scope of the invention as set forth herein.

What is claimed is:

1. A three-dimensional display radar comprising:
   a radar transmitter-receiver unit for producing signals indicative of information about a bearing of a target, information about distance to said target and information about the received power reflected from said target, respectively;
   a display;
   a three-dimensional coordinate converter for converting said bearing information, said distance information and said received power information into signals indicative of both an X-Y coordinate and the height of said target;
   marker generating means for generating range marker signals when said target is three-dimensionally represented on a screen of said display; and
   memory means having storage addresses corresponding to respective pixels on said display and for storing said received power information at a storage address corresponding to said X-Y coordinate obtained from said three-dimensional coordinate converter and storing therein said marker signals generated from said marker generating means, said memory means being further adapted to successively read said received power information and said marker signals so a to deliver image signals to said display.

2. A three-dimensional display radar as claimed in claim 1, wherein said display is of a raster-scan type.

3. A three-dimensional display radar as claimed in claim 1, wherein said marker generating means is used to generate signals indicative of grid-shaped range markers.

4. A three-dimensional display radar as claimed in claim 1, wherein said memory means is a video memory.

5. A three-dimensional display radar as claimed in claim 1, further comprising a two-dimensional coordinate converter for converting said bearing information and said distance information into a X-Y coordinate.

6. A three-dimensional display radar as claimed in claim 5, wherein said marker generating means is used to generate signals indicative of concentric circle-shaped range markers when said target is two-dimensionally represented on the screen of said display.

7. A three-dimensional display radar as claimed in claim 5, wherein said memory means stores therein received power information at a storage address corresponding to the X-Y coordinate obtained from said two-dimensional coordinate converter when said target is two-dimensionally represented on the screen of said display and also stores therein said range marker signals generated from said marker generating means, said memory means being further used to successively read said received power information and said range marker signals stored therein so as to deliver image signals to said display.

8. A three-dimensional display radar as claimed in claim 5, further comprising mode selecting means for selecting either said three-dimensional coordinate converter or said two-dimensional coordinate converter.

9. A three-dimensional display radar as claimed in claim 8, wherein when said mode selecting means selects said two-dimensional coordinate converter, said display represents, as brightness information, a target captured through said radar transmitter-receiver unit according to the received power, and when said mode selecting means selects said three-dimensional coordinate converter, said display shows, as height information, a target captured through said radar transmitter-receiver unit according to the received power.

10. A three-dimensional display radar as claimed in claim 5, wherein said display is of a raster-scan type.

11. A three-dimensional display radar as claimed in claim 5, wherein said memory means is a video memory.

12. A three-dimensionally display radar as claimed in claim 2, wherein said memory means is a video memory.

13. A three-dimensional display radar as claimed in claim 3, wherein said memory means is a video memory.

14. A three-dimensional display radar as claimed in claim 9, wherein said memory means is a video memory.

* * * * *

UNITED STATES PATENT AND TRADEMARK OFFICE
CERTIFICATE OF CORRECTION

PATENT NO. : 5,061,935
DATED : October 29, 1991
INVENTOR(S) : SEKINE et al

It is certified that error appears in the above-identified patent and that said Letters Patent is hereby corrected as shown below:

Column 5, line 3, change "coord" to read

--coordinates (X, Y) of--.

Signed and Sealed this

Twenty-seventh Day of April, 1993

Attest:

MICHAEL K. KIRK

*Attesting Officer*   *Acting Commissioner of Patents and Trademarks*